(12) United States Patent
Akahori et al.

(10) Patent No.: US 9,644,093 B2
(45) Date of Patent: May 9, 2017

(54) THERMOPLASTIC POLYMER COMPOSITION, SHOES AND OUTER SOLES

(71) Applicant: KURARAY CO., LTD., Kurashiki-shi (JP)

(72) Inventors: Yosuke Akahori, Kamisu (JP); Daisuke Konishi, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 71 days.

(21) Appl. No.: 14/765,377

(22) PCT Filed: Feb. 5, 2014

(86) PCT No.: PCT/JP2014/052691
§ 371 (c)(1),
(2) Date: Aug. 3, 2015

(87) PCT Pub. No.: WO2014/123163
PCT Pub. Date: Aug. 14, 2014

(65) Prior Publication Data
US 2015/0368455 A1    Dec. 24, 2015

(30) Foreign Application Priority Data

Feb. 6, 2013 (JP) .................................. 2013-021663

(51) Int. Cl.
| | | |
|---|---|---|
| *C08L 53/02* | (2006.01) | |
| *A43B 1/14* | (2006.01) | |
| *C08L 23/12* | (2006.01) | |
| *A43B 13/04* | (2006.01) | |

(52) U.S. Cl.
CPC ............. *C08L 53/02* (2013.01); *A43B 1/14* (2013.01); *A43B 13/04* (2013.01); *C08L 23/12* (2013.01); *C08L 53/025* (2013.01); *C08L 2201/10* (2013.01); *C08L 2205/025* (2013.01); *C08L 2205/035* (2013.01); *C08L 2207/04* (2013.01)

(58) Field of Classification Search
None
See application file for complete search history.

(56) References Cited

U.S. PATENT DOCUMENTS

| | | |
|---|---|---|
| 6,399,200 B1 | 6/2002 | Sugimoto et al. |
| 2003/0119971 A1 | 6/2003 | Donald et al. |
| 2008/0118750 A1 | 5/2008 | Sasagawa et al. |
| 2010/0152386 A1* | 6/2010 | Miwa ............... C08F 8/04 525/98 |
| 2010/0174027 A1* | 7/2010 | Sasaki ............. C08L 23/02 524/505 |

FOREIGN PATENT DOCUMENTS

| | | |
|---|---|---|
| JP | 7-149971 A | 6/1995 |
| JP | 11-263880 A | 9/1999 |
| JP | 2002-119614 A | 4/2002 |
| JP | 2004-2657 A | 1/2004 |
| JP | 2004-91531 A | 3/2004 |
| JP | 2004-231820 A | 8/2004 |
| JP | 2004-339339 A | 12/2004 |
| JP | 2005-272527 A | 10/2005 |
| JP | 2010-126612 A | 6/2010 |
| JP | 2010-126636 A | 6/2010 |
| WO | 2008/146739 A1 | 12/2008 |
| WO | 2009/154251 A1 | 12/2009 |

OTHER PUBLICATIONS

International Search Report issued Mar. 25, 2014 in PCT/JP2014/052691 filed Feb. 5, 2014.
Extended European Search Report issued Aug. 24, 2016 in Patent Application No. 14748833.2.

* cited by examiner

*Primary Examiner* — Jeffrey Mullis
(74) *Attorney, Agent, or Firm* — Oblon, McClelland, Maier & Neustadt, L.L.P.

(57) ABSTRACT

Provided are a thermoplastic polymer composition having excellent mechanical strength and also having both of abrasion resistance and transparency; shoes, in which the thermoplastic polymer composition is used; and an outer sole, in which the thermoplastic polymer composition is used. The thermoplastic polymer composition contains (I) a hydrogenated product of a block copolymer having a polymer block (A) mainly containing α-methylstyrene units and a polymer block (B) mainly containing conjugated diene compound units; (II) a hydrogenated product of a block copolymer having a polymer block (A') mainly containing aromatic vinyl compound units other than α-methylstyrene and a polymer block (B') mainly containing conjugated diene compound units, in which the block copolymer has a hydroxyl group; (III) a polypropylene-based polymer; and (IV) a polyethylene-based polymer.

6 Claims, 1 Drawing Sheet

THERMOPLASTIC POLYMER COMPOSITION, SHOES AND OUTER SOLES

TECHNICAL FIELD

The present invention relates to a thermoplastic polymer composition. The present invention further relates to shoes, in which the thermoplastic polymer composition is used, and an outer sole, in which the thermoplastic polymer composition is used.

BACKGROUND ART

Styrene-based thermoplastic elastomers have rubber elasticity at room temperature, excellent physical properties such as flexibility and moldability, low specific gravity, and excellent recyclability. Therefore, while being accompanied by problems such as environmental pollution, the styrene-based thermoplastic elastomers have recently been used as a substitute for vulcanized rubber and polyvinyl chloride in a wide range of fields including automobile parts, industrial parts, sundry goods, and sporting goods.

Among the styrene-based thermoplastic elastomers, a styrene-butadiene-styrene block copolymer (SBS), a styrene-isoprene-styrene block copolymer (SIS), and hydrogenated products thereof have been widely used due to their low cost as well as excellent flexibility, rubber elasticity, recyclability, and the like.

Meanwhile studies have been conducted to improve various physical properties of styrene-based thermoplastic elastomer compositions, and the following compositions, for example, have been proposed:

1) a composition having a good balance of heat resistance and flow characteristics, which includes a polyolefin-based resin, and a hydrogenated product of a block copolymer having a polymer block mainly containing α-methylstyrene and a polymer block containing isoprene and/or butadiene (see PTL 1);

2) a composition having excellent scratch resistance and abrasion resistance, which includes an acryl-based polymer, a hydrogenated product of a block copolymer including a polymer block mainly containing α-methylstyrene and a polymer block containing isoprene and/or butadiene, and a softener (see PTL 2);

3) a thermoplastic resin composition having excellent moldability and abrasion resistance, which is a thermoplastic resin composition for a golf ball, including a styrene-based thermoplastic elastomer, a softener, a peroxide-cross-linkable olefin-based resin, a peroxide-decomposable olefin-based resin, and an organic peroxide, and (see PTL 3); and 4) a composition having excellent releasability and abrasion resistance in powder molding, which is a resin composition for powder molding, including a polypropylene-based resin, an olefin-based thermoplastic elastomer, a styrene-based thermoplastic elastomer, and a silicone oil-containing olefin-based resin (see PTL 4).

However, the composition of PTL 1 has excellent heat resistance and flow characteristics, but it is hard to say that the composition has sufficient abrasion resistance. Further, the composition of PTL 2 is highly flexible and has excellent properties such as molding processability and transparency while maintaining surface characteristics such as surface hardness, weather resistance, and transparency, attributed to the acrylic-based resins. However, since the acrylic-based resins have hygroscopicity, a drying step or the like is required at a time of molding processing, and as a result, the molding processing step is complicated. PTL 3 describes Taber abrasion values with regard to the composition of PTL 3, but the values are not fully satisfactory. Further, the composition requires dynamic cross-linking, and accordingly, the molding processability is deteriorated. In addition, with regard to the composition of PTL 4, the evaluation results of the properties of the molded surfaces before and after an abrasion test using an unbleached muslin No. 3 cloth are disclosed, but the results of abrasion resistance evaluation are not fully satisfactory. In addition, the silicone oil or the silicone rubber is problematic in bleeding on the molded surface.

Therefore, the present inventors have once developed the following composition in order to provide a composition having good flexibility, lightweightness, molding processability, and heat resistance, in particular, excellent abrasion resistance (see PTL 5).

5) a thermoplastic polymer composition including at least one block copolymer (a) selected from an α-methylstyrene-based block copolymer with a number average molecular weight of 30,000 to 500,000, including a polymer block A containing α-methylstyrene units and a polymer block B containing conjugated diene compound units, and a hydrogenated product thereof; a propylene-based polymer (b); and an ethylene-based polymer (c) having a density of 0.94 g/cm$^3$ or less, at a ratio satisfying the following expressions (1) and (2):

$$0.1 \leq W(a)/[W(a)+W(b)+W(c)] \leq 0.8$$

$$1 \leq W(b)/W(c)$$

wherein W(a), W(b), and W(c) represent masses of the block copolymer (a), the propylene-based polymer (b), and the ethylene-based polymer (c), respectively.

In addition, as a composition having excellent fluidity, tensile strength at break, and weld strength:

6) a thermoplastic polymer composition including a block copolymer and/or a hydrogenated product thereof (a) having a polymer block A mainly containing α-methylstyrene units and a polymer block B mainly containing conjugated diene compound units; and a hydrogenated product (b) of a block copolymer having a polymer block A' mainly containing aromatic vinyl compound units other than α-methylstyrene units and a polymer block B' mainly containing conjugated diene compound units, in which the number average molecular weight of the block copolymer and/or a hydrogenated product thereof (a) is 30,000 to 350,000, and the hydrogenated product (b) of the block copolymer is 100,000 to 500,000 has been proposed (see PTL 6). Further, as a composition for use in an elastic band, which has a good balance of flexibility, tensile strength, permanent tensile strain, and heat resistance, 7) a thermoplastic elastomer composition including a block copolymer (a) with a number average molecular weight of 130,000 to 600,000, obtained by hydrogenation of a block copolymer including a polymer block mainly containing styrene units and a polymer block mainly containing conjugated diene compound units; and a block copolymer (b) with a number average molecular weight of 70,000 to 600,000, obtained by hydrogenation of a block copolymer including a polymer block mainly containing α-methylstyrene units and a polymer block mainly containing conjugated diene compound units, in which the mass ratio of (a):(b) is 2:98 to 98:2 and the hardness is 1 to 90 has been proposed (see PTL 7).

CITATION LIST

Patent Literature

[PTL 1] JP 2004-91531-A
[PTL 2] JP 2004-2657-A

[PTL 3] JP 2002-119614-A
[PTL 4] JP 2004-231820-A
[PTL 5] WO 2008/146739
[PTL 6] JP 2010-126636-A
[PTL 7] JP 2010-126612-A

SUMMARY OF INVENTION

Technical Problem

As one of the applications of styrene-based thermoplastic elastomers, sporting goods as described above, and more specifically shoes and an outer sole of shoes may be mentioned. In particular, shoes for sports which involve a violent movement, such as rugby, American football, soccer, baseball, tennis, and marathon, require higher abrasion resistance than normal shoes, and more recently, they tend to require a high level of fashion, and as a result, it also requires transparency to facilitate coloration.

Here, the thermoplastic polymer composition disclosed in PTL 5 has reliably excellent flexibility, less weight, molding processability, heat resistance, and abrasion resistance, but it still needs to improve the abrasion resistance. Further, according to the studies conducted by the present inventors, the thermoplastic polymer composition still needs to improve the transparency (see Comparative Example of the present specification). According to the studies conducted by the present inventors, it could be seen that the thermoplastic polymer compositions disclosed in PTLs 6 and 7 have insufficient strength, abrasion resistance, and transparency, and it still needs to improve those properties.

Therefore, it is an object of the present invention to provide a thermoplastic polymer composition having excellent mechanical strength and also having both of abrasion resistance and transparency; shoes, in which the thermoplastic polymer composition is used; and an outer sole, in which the thermoplastic polymer composition is used.

Solution to Problem

According to the present invention, the object above is achieved by providing [1] to [6] below.

[1] A thermoplastic polymer composition including:

(I) a hydrogenated product of a block copolymer having a polymer block (A) mainly containing α-methylstyrene units and a polymer block (B) mainly containing conjugated diene compound units, in which the block copolymer has a number average molecular weight of 30,000 to 500,000, (II) a hydrogenated product of a block copolymer having a polymer block (A') mainly containing aromatic vinyl compound units other than α-methylstyrene and a polymer block (B') mainly containing conjugated diene compound units, in which the block copolymer has a number average molecular weight of 15,000 to 500,000 and has a hydroxyl group, (III) a polypropylene-based polymer, and (IV) a polyethylene-based polymer at a ratio satisfying the following expressions (1) to (4), in which the mass ratio [(I):(II)] of the component (I) to the component (II) is 10:90 to 90:10:

$$0.03 \leq W(I)/(W(I)+W(II)+W(III)+W(IV)) \leq 0.9 \quad (1)$$

$$0.03 \leq W(II)/(W(I)+W(II)+W(III)+W(IV)) \leq 0.9 \quad (2)$$

$$0.03 \leq W(III)/(W(I)+W(II)+W(III)+W(IV)) \leq 0.9 \quad (3)$$

$$0.03 \leq W(IV)/(W(I)+W(II)+W(III)+W(IV)) \leq 0.9 \quad (4)$$

wherein W(I), W(III), and W(IV) represent the mass contents of the component (I), the component (II), the component (III), and the component (IV) in the thermoplastic polymer composition, respectively.

[2] The thermoplastic polymer composition according to [1], in which in the component (I), the number average molecular weight of the polymer block (A) is 1,000 to 50,000, and the polymer block (B) includes a block (b1) with a number average molecular weight of 1,000 to 30,000, in which the content of 1,4-bond structural units in the conjugated diene compound units is less than 30% by mole, and a block (b2) with a number average molecular weight of 10,000 to 400,000, in which the content of 1,4-bond structural units in the conjugated diene compound units is 30% by mole or more.

[3] The thermoplastic polymer composition according to [1] or [2], in which the polymer block (B') in the component (II) has at least one kind of isoprene-derived 1,4-bond structural units and butadiene-derived 1,4-bond structural units, and the content of the 1,4-bond structural units is 30% by mole or more of the structural units constituting the polymer block (B').

[4] The thermoplastic polymer composition according to any one of [1] to [3], in which the polymer block (B') in the component (II) has at least one kind of isoprene-derived 3,4-bond structural units and butadiene-derived 1,2-bond structural units, and the content of the 3,4-bond structural units and the 1,2-bond structural units is less than 30% by mole of the structural units constituting the polymer block (B').

[5] Shoes, in which the thermoplastic polymer composition according to any one of [1] to [4] is used in at least a part thereof.

[6] An outer sole, in which the thermoplastic polymer composition according to any one of [1] to [4] is used in at least a part thereof.

Advantageous Effects of Invention

According to the present invention, a thermoplastic polymer composition having excellent mechanical strength and also having both of abrasion resistance and transparency; shoes, in which the thermoplastic polymer composition is used; and an outer sole, in which the thermoplastic polymer composition is used can be provided.

DESCRIPTION OF EMBODIMENTS

Figure 1:
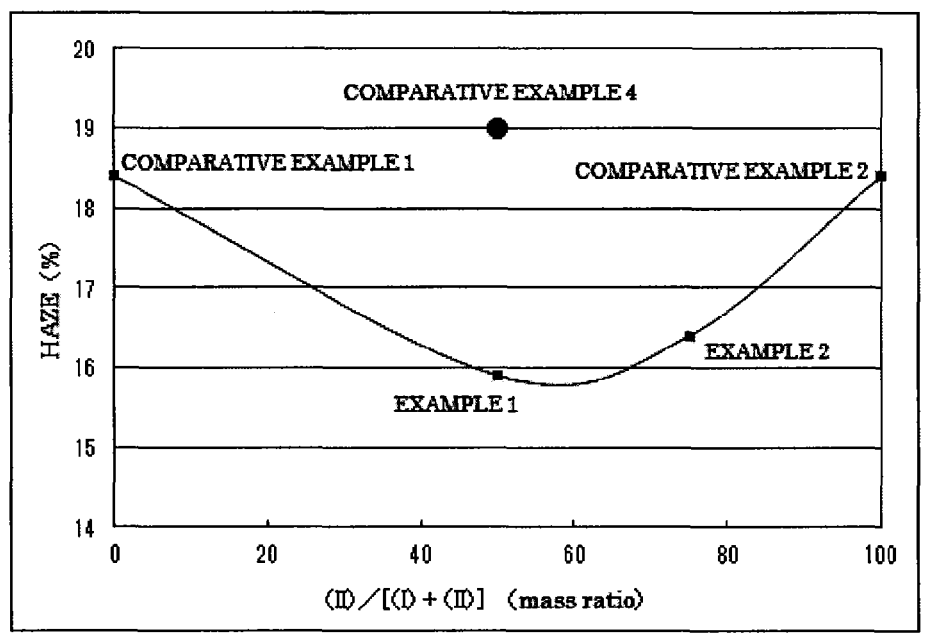
FIG. 1 is a graph showing the haze of the thermoplastic polymer compositions obtained in Examples 1 and 2, and Comparative Examples 1, 2, and 4.

The thermoplastic polymer composition of the present invention includes:

(I) a hydrogenated product of a block copolymer having a polymer block (A) mainly containing α-methylstyrene units and a polymer block (B) mainly containing conjugated diene compound units, in which the block copolymer has a number average molecular weight of 30,000 to 500,000, (II) a hydrogenated product of a block copolymer having a polymer block (A') mainly containing aromatic vinyl compound units other than α-methylstyrene and a polymer block (B') mainly containing conjugated diene compound units, in which the block copolymer has a number average molecular weight of 15,000 to 500,000 and has a hydroxyl group, (III) a polypropylene-based polymer, and (IV) a polyethylene-based polymer at a ratio satisfying the following expressions (1) to (4), and the mass content ratio [(I):(II)] of the component (I) to the component (II) is 10:90 to 90:10:

$$0.03 \leq W(I)/(W(I)+W(II)+W(III)+W(IV)) \leq 0.9 \quad (1)$$

$$0.03 \leq W(II)/(W(I)+W(II)+W(III)+W(IV)) \leq 0.9 \quad (2)$$

$$0.03 \leq W(III)/(W(I)+W(II)+W(III)+W(IV)) \leq 0.9 \quad (3)$$

$$0.03 \leq W(IV)/(W(I)+W(II)+W(III)+W(IV)) \leq 0.9 \quad (4)$$

wherein W(I), W(III), and W(IV) represent the mass contents of the component (I), the component (II), the component (III), and the component (IV) in the thermoplastic polymer composition, respectively.

Hereinafter, the respective components will be described in order.

Furthermore, in the following description, the restriction with "being preferable" can be arbitrarily adopted and a combination of restrictions with "being preferable" can be said to mean being more preferred.

[Component (I)]

The component (I) is a hydrogenated product of a block copolymer having a polymer block (A) mainly containing α-methylstyrene units and a polymer block (B) mainly containing conjugated diene compound units, in which the block copolymer has a number average molecular weight of 30,000 to 500,000 (hereinafter sometimes simply referred to as a hydrogenated product).

As compared with a case where the polymer block (A) of the component (I) uses a hydrogenated product of a block copolymer which is a unit other than the α-methylstyrene unit, for example, a styrene unit, the abrasion resistance and the transparency of the thermoplastic polymer composition are significantly improved by using the component (I).

The total content of the polymer block (A) and the polymer block (B) in the component (I) is preferably 70% by mass or more, more preferably 80% by mass or more, still more preferably 90% by mass or more, and particularly preferably 95% by mass or more. The value is a value determined while not considering the residue of a coupling agent as described later.

(Polymer Block (A))

The polymer block (A) constituting a part of the component (I) mainly contains α-methylstyrene units. The expression "mainly containing" as used herein means being composed of the α-methylstyrene units in an amount of 50% by mass or more based on the total mass of the polymer block (A). The content of the α-methylstyrene unit in the polymer block (A) is more preferably 70% by mass or more, still more preferably 90% by mass or more, and particularly preferably 95% by mass or more, based on the total mass of the polymer block (A), from the viewpoints of the heat resistance and the mechanical strength of the thermoplastic polymer composition.

Within a range not adversely affecting the object of the present invention as described above, the polymer block (A) may usually contain other monomer units in the amount of preferably 50% by mass or less, more preferably 30% by mass or less, still more preferably 10% by mass or less, and particularly preferably 5% by mass or less, based on the total mass of the polymer block (A). Such other monomer units are not particularly limited as long as they are generally units including anionic polymerizable monomers. Examples of such other monomers include at least one selected from aromatic vinyl compounds such as styrene, o-methylstyrene, m-methylstyrene, p-methylstyrene, 1,3-dimethylstyrene, diphenylethylene, 1-vinylnaphthalene, 4-propylstyrene, 4-cyclohexylstyrene, 4-dodecylstyrene, 2-ethyl-4-benzylstyrene, and 4-(phenylbutyl)styrene; and conjugated diene compounds such as butadiene, isoprene, and 2,3-dimethyl-1,3-butadiene. In particular, styrene and p-methylstyrene are suitable. In a case where the polymer block (A) contains other polymerizable monomer units, it may contain such other polymerizable monomer units in any of random and tapered forms.

The number average molecular weight of the polymer block (A) is preferably 1,000 to 50,000, more preferably 2,000 to 30,000, and still more preferably 3,000 to 15,000. If the number average molecular weight of the polymer block (A) is 1,000 or more, the thermoplastic polymer composition has good permanent compression strain at a high temperature, whereas if the number average molecular weight of the polymer block (A) is 50,000 or less, the melt viscosity of the block copolymer does not become too high, and the block copolymer is easily melt-mixed with other components and has excellent processability. Further, the number average molecular weight as mentioned in the present specification is a molecular weight relative to polystyrene as a standard, as determined by measurement with gel permeation chromatography (GPC).

The content of the polymer block (A) in the block copolymer is preferably 5% by mass to 70% by mass, more preferably 10% by mass to 65% by mass, still more preferably 20% by mass to 60% by mass, and particularly preferably 25% by mass to 55% by mass, based on the total mass of the polymer blocks (A) and (B). If the content of the polymer block (A) is 5% by mass or more, the thermoplastic polymer composition has improved dynamic strength, good permanent compression strain at a high temperature, and excellent heat resistance. If the content of the polymer block (A) is 70% by mass or less, the melt viscosity of the block copolymer does not become too high, and the block copolymer is easily melt-mixed with other components and has excellent flexibility when being formed into a thermoplastic polymer composition.

(Polymer Block (B))

The polymer block (B) constituting a part of the component (I) mainly contains conjugated diene compound units. The expression "mainly containing" as used herein means being composed of the conjugated diene compound units in an amount of 50% by mass or more based on the total mass of the polymer block (B). The content of the conjugated diene compound unit in the polymer block (B) is more preferably 70% by mass or more, still more preferably 90% by mass or more, and particularly preferably 95% by mass or more, based on the total mass of the polymer block (B). Examples of the conjugated diene compound forming the conjugated diene compound units at least one selected from butadiene, isoprene, 2,3-dimethyl-1,3-butadiene, 1,3-pentadiene, 1,3-hexadiene, and the like. Among these, butadiene, isoprene, or a mixture of butadiene and isoprene is preferred. In a case where two or more kinds of the conjugated diene compound units are contained, they may be contained in any of random, block, and tapered forms.

Furthermore, the polymer block (B) may contain other anionic polymerizable monomers other than the conjugated diene compound units if the amount of the monomers is usually preferably 50% by mass or less, more preferably 30% by mass or less, still more preferably 10% by mass or less, and particularly preferably 5% by mass or less, based on the total mass of the polymer block (B), within a range not adversely affecting the purpose of the present invention. Examples of the monomers include at least one aromatic vinyl compound selected from styrene, α-methylstyrene, o-methylstyrene, m-methylstyrene, p-methylstyrene, 1,3-dimethylstyrene, diphenylethylene, 1-vinylnaphthalene, 4-propylstyrene, 4-cyclohexylstyrene, 4-dodecylstyrene, 2-ethyl-4-benzylstyrene, 4-(phenylbutyl)styrene, and the like. If the polymer block (B) contains monomers other than the conjugated diene compound units, it may contain such other monomers in any of random and tapered forms.

The content of the polymer block (B) in the block copolymer is preferably 30% by mass to 95% by mass, more preferably 35% by mass to 90% by mass, still more preferably 40% by mass to 80% by mass, and particularly preferably 45% by mass to 75% by mass, based on the total mass of the polymer blocks (A) and (B). If the content of the polymer block (B) is 30% by mass or more, the melt viscosity of the block copolymer does not become too high and the block copolymer is easily melt-mixed with other components, whereas if the content of the polymer block (B) is 95% by mass or less, the permanent compression strain at a high temperature is excellent when being formed into a thermoplastic polymer composition.

The number average molecular weight of the polymer block (B) is preferably 10,000 to 349,000, more preferably 20,000 to 320,000, and still more preferably 30,000 to 300,000. If the number average molecular weight of the polymer block (B) is 10,000 or more, the heat resistance of the thermoplastic polymer composition is improved, whereas if the number average molecular weight is 349,000 or less, the melt viscosity of the block copolymer does not become too high, and the block copolymer is easily melt-mixed with other components, and thus, has excellent processability.

(Bonding Type of Polymer Block (A) and Polymer Block (B))

The bonding type of the polymer block (A) and the polymer block (B) in the block copolymer used as the component (I) of the present invention may be any of linear, branched, and radial types, or a combination thereof.

Among these, for example, when the polymer block (A) is represented by A and the polymer block (B) is represented by B, examples of such a block copolymer include an A-B type diblock copolymer, an A-B-A type triblock copolymer, an A-B-A-B type tetrablock copolymer, and an $(A-B)_nX$ type copolymer, wherein X represents a residue of a coupling agent, and n is an integer of 3 or more. The block copolymers of these bonding types may be used alone or in combination of two or more kinds thereof. Among these, an A-B-A type triblock copolymer, or a mixture of an A-B-A type triblock copolymer and an A-B type diblock copolymer is preferred.

Here, in the present specification, in a case where the same kinds of polymer blocks are linearly bonded to each other through a divalent coupling agent or the like, the entire polymer blocks bonded are handled as one polymer block. Thus, including those exemplified, more strictly, excluding a case where a polymer block denoted by Y-X-Y, wherein X represents a residue of a coupling agent, needs to be distinguished from a single polymer block Y, the polymer block is collectively denoted as Y. In the present specification, since such a kind of polymer block including a residue of a coupling agent is handled as above, it includes, for example, a residue of a coupling agent, and strictly, a block copolymer denoted by Y-Z-X-Z-Y, wherein X represents a residue of a coupling agent, is denoted as Y-Z-Y and handled as one example of the triblock copolymer.

Furthermore, the block copolymer which is used in the component (I) of the present invention may be copolymerized with a polymer block (C) including other polymerizable monomers such as methyl methacrylate and styrene, in addition to the α-methylstyrene and the conjugated diene compound, within a range not adversely affecting the purpose of the present invention. In this case, when the polymer block (C) is represented by C, examples of the structure of the block copolymer include an A-B-C type triblock copolymer, an A-B-C-A type tetrablock copolymer, and an A-B-A-C type tetrablock copolymer.

Moreover, the block copolymer is preferably hydrogenated from the viewpoints of heat resistance and weather resistance, for example. Although the hydrogenation rate is not particularly limited, 70% by mole or more, more preferably 80% by mole or more, still more preferably 85% by mole or more, even still more preferably 90% by mole or more, and particularly preferably 95% by mole or more of at least the carbon-carbon double bonds based on the conjugated diene compound units in the polymer block (B) are hydrogenated. The hydrogenation rate is a value calculated using a nuclear magnetic resonance spectrum ($^1$H-NMR spectrum), which shall apply hereinafter.

(Method for Producing Hydrogenated Product of Block Copolymer)

The block copolymer before hydrogenation can be produced by an anionic polymerization method, and specific synthesis examples therefor are as follows.

<Polymerization>

(1) A method for obtaining an A-B-A type block copolymer by polymerizing conjugated diene compounds in a tetrahydrofuran solvent using a dianionic initiator, and subsequently polymerizing α-methylstyrene under a condition of a temperature of −78° C. (see Macromolecules, vol. 2, pp. 453-458 (1969)).

(2) A method for obtaining an $(A-B)_nX$ type block copolymer by bulk-polymerizing α-methylstyrene using an anionic initiator, and subsequently polymerizing conjugated diene compounds, and then carrying out a coupling reaction by a coupling agent such as tetrachlorosilane (see Kautsch. Gummi. Kunstst., vol. 37, pp. 377-379 (1984); and Polym. Bull., vol. 12, pp. 71-77 (1984)).

(3) A method for obtaining an A-B-A type block copolymer by polymerizing α-methylstyrene at a concentration of 5% by mass to 50% by mass at a temperature of −30° C. to 30° C. in a nonpolar solvent using an organolithium compound as a polymerization initiator in the presence of a polar compound at a concentration of 0.1% by mass to 10% by mass, polymerizing conjugated diene compounds with the obtained living polymer, and then adding a coupling agent thereto.

(4) A method for obtaining an A-B—C type block copolymer by polymerizing α-methylstyrene at a concentration of 5% by mass to 50% by mass at a temperature of −30° C. to 30° C. in a nonpolar solvent using an organolithium compound as a polymerization initiator in the presence of a polar compound at a concentration of 0.1% by mass to 10% by mass, polymerizing conjugated diene compounds with the obtained living polymer, and then polymerizing anion polymerizable monomers other than α-methylstyrene with a living polymer of a block copolymer including the obtained α-methylstyrene polymer blocks and conjugated diene polymer blocks.

Among the methods, the methods (3) and (4) are preferred, and the method (3) is more preferred.

Examples of the organolithium compound used as a polymerization initiator in the methods above include monolithium compounds such as methyl lithium, ethyl lithium, pentyl lithium, n-butyl lithium, sec-butyl lithium, and tert-butyl lithium, and dilithium compounds such as tetraethylene dilithium.

The solvent used for the polymerization of α-methylstyrene is a nonpolar solvent, and examples thereof include aliphatic hydrocarbons such as cyclohexane, methylcyclohexane, n-hexane, and n-pentane, and aromatic hydrocarbons such as benzene, toluene, and xylene.

The polar compound used for the polymerization of α-methylstyrene is a compound not having a functional group (such as a hydroxy group and a carbonyl group) that reacts with an anionic species but having a hetero atom such as an oxygen atom and a nitrogen atom in the molecule, and examples of the polar compound include dimethyl ether, diethyl ether, monoglyme, N,N,N',N'-tetramethylethylene diamine, triethylamine, N-methylmorpholine, dimethoxyethane, diethylene glycol dimethyl ether, and tetrahydrofuran.

When α-methylstyrene is polymerized at a high conversion rate and a conjugated diene compound is then polymerized, the concentration of the polar compound in the reaction system is preferably 0.1% by mass to 10% by mass, and more preferably 0.5% by mass to 3% by mass, from the viewpoint of controlling the amount of 1,4-bonds in the polymer block (B).

From the viewpoints of the polymerization of α-methylstyrene at a high conversion rate and the viscosity of the reaction solution in the late stage of polymerization, the concentration of α-methylstyrene in the reaction system is preferably in the range of 5% by mass to 50% by mass, and more preferably in the range of 25% by mass to 40% by mass in the beginning of polymerization.

Furthermore, the conversion rate means the ratio of the amount of non-polymerized α-methylstyrene converted to a block copolymer by polymerization, and in the present invention, the conversion rate is preferably approximately 70% by mass or more, and more preferably 85% by mass or more.

From the viewpoints of the ceiling temperature (a temperature at which the polymerization reaction reaches an equilibrium state and does not substantially proceed) of α-methylstyrene, the polymerization rate of α-methylstyrene, the living properties, and the like, the temperature condition during the polymerization of α-methylstyrene is preferably −30° C. to 30° C., more preferably −20° C. to 10° C., and still more preferably −15° C. to 0° C. By setting the polymerization temperature to 30° C. or lower, α-methylstyrene can be polymerized at a high conversion rate. In addition, the deactivation ratio of the produced living polymer is small, and the mixing of homopoly-α-methylstyrene with the obtained block copolymer is suppressed, so that the properties are less likely to be impaired. By setting the polymerization temperature to −30° C. or higher, the reaction solution can be stirred while preventing the viscosity of the reaction solution from being increased in the late stage of the polymerization of α-methylstyrene. Therefore, the cost required for maintaining a low-temperature state is not increased, and thus such the polymerization temperature is economically preferred.

In the above methods, other vinyl compounds may be allowed to coexist during the polymerization of α-methylstyrene and be copolymerized with α-methylstyrene as long as the characteristics of the α-methylstyrene polymer block are not impaired. Examples of the aromatic vinyl compounds include at least one selected from styrene, o-methylstyrene, m-methylstyrene, p-methylstyrene, 1,3-dimethylstyrene, vinylnaphthalene, and vinylanthracene.

A living poly-α-methylstyryl lithium is produced by the polymerization of α-methylstyrene using organolithium as a polymerization initiator, and subsequently, the living poly-α-methylstyryl lithium is copolymerized with conjugated diene compounds. Examples of the conjugated diene compounds include at least one selected from butadiene, isoprene, 2,3-dimethyl-1,3-butadiene, 1,3-pentadiene, and 1,3-hexadiene. Among these, butadiene and isoprene are preferred.

The conjugated diene compounds are polymerized by adding them to the reaction system. A method for adding the conjugated diene compounds to the reaction system is not particularly limited, and the conjugated diene compounds may be directly added to a living poly-α-methylstyryl lithium solution or are diluted with a solvent and then added.

As for a method for diluting conjugated diene compounds in a solvent and adding the dilution, the conjugated diene compounds may be added and then diluted with a solvent; conjugated diene compounds and a solvent may be introduced at the same time; or conjugated diene compounds may be added after being diluted with a solvent. Preferably, recommended is a method, in which conjugated diene compounds are added in an amount corresponding to 1 mole equivalent to 100 mole equivalents, and preferably 5 mole equivalents to 50 mole equivalents, based on the living poly-α-methylstyryl lithium, whereby the living active terminals are modified. Then, the mixture is diluted with a solvent and subsequently, the rest of the conjugated diene compounds are introduced and subjected to a polymerization reaction at a temperature of higher than 30° C., and preferably of 40° C. to 80° C.

To modify the active terminals of the living poly-α-methylstyryl lithium, aromatic vinyl compounds such as styrene, o-methylstyrene, m-methylstyrene, p-methylstyrene, 1,3-dimethylstyrene, vinylnaphthalene, vinylanthracene, and 1,1-diphenylethylene may be used instead of the conjugated diene compounds.

Examples of the solvent used herein for dilution include aliphatic hydrocarbons such as cyclohexane, methylcyclohexane, n-hexane, and n-heptane, and aromatic hydrocarbons such as benzene, toluene, and xylene.

The block copolymer thus obtained can be acquired by pouring a polymerization reaction liquid into methanol to coagulate the block copolymer, followed by carrying out heating or drying under reduced pressure, or by pouring a polymerization reaction liquid into boiling water to remove the solvent through azeotropy, so-called steam stripping, followed by carrying out heating or drying under reduced pressure.

A triblock or radial teleblock type block copolymer can be produced by reacting, for example, a polyfunctional coupling agent with a living polymer of a block copolymer including the α-methylstyrene polymer block obtained by the copolymerization of the living poly-α-methylstyryl lithium with the conjugated diene compounds and the conjugated diene polymer block.

The block copolymer in this case may be a mixture containing any proportions of diblock, triblock, and radial teleblock type block copolymers, which are obtained by adjusting the amount of the polyfunctional coupling agent to be used.

Examples of the polyfunctional coupling agent include phenyl benzoate, methyl benzoate, ethyl benzoate, methyl acetate, ethyl acetate, methyl pivalate, ethyl pivalate, phenyl pivalate, α,α'-dichloro-o-xylene, α,α'-dichloro-m-xylene, α,α'-dichloro-p-xylene, bis(chloromethyl)ether, dibromomethane, diiodomethane, dimethyl phthalate, dichlorodimethylsilane, dichlorodiphenylsilane, trichloromethylsilane, tetrachlorosilane, and divinylbenzene.

<Hydrogenation Reaction>

The block polymer including a polymer block (A) mainly containing α-methylstyrene units and a polymer block (B) mainly containing conjugated diene compound units is used as a hydrogenated product (component (I)) formed by hydrogen addition (hereinafter sometimes simply referred to as a hydrogenation) of at least a part (70% or more) of carbon-carbon double bonds based on the conjugated diene compound units in the block copolymer, from the viewpoints of good resistance and weather resistance, for example.

In a case of hydrogenating the block copolymer, it is possible to obtain a hydrogenated product by polymerizing conjugated diene compounds with living poly-α-methylstyryl lithium, and then adding active hydrogen compounds such as alcohols, carboxylic acids, and water thereto to terminate the polymerization reaction, and carrying out hydrogenation in an inert organic solvent in the presence of a hydrogenation catalyst according to a known method.

In addition, in a case of hydrogenating a triblock or radial teleblock type block copolymer obtained by reacting a polyfunctional coupling agent with the living polymer of the copolymer, it is possible to obtain a hydrogenated product by adding active hydrogen compounds such as an alcohol, a carboxylic acid, and water, as necessary, to terminate the coupling reaction, and then carrying out hydrogenation in an inert organic solvent in the presence of a hydrogenation catalyst according to a known method.

The block copolymer, a non-hydrogenated A-B-C type triblock copolymer obtained by polymerizing α-methylstyrene and anionic polymerizable monomers other than conjugated diene compounds with the block copolymer, or a non-hydrogenated triblock type block copolymer or a non-hydrogenated radial teleblock type block copolymer (both included in the "block copolymer" used in the present invention) obtained by reacting a polyfunctional coupling agent with a living polymer of a block copolymer including the polymer block (A) and the polymer block (B) can be subjected to hydrogenation as it is without replacing the solvent that has been used for the production thereof.

The hydrogenation reaction may be carried out under the conditions of a reaction temperature of 20° C. to 100° C. and a hydrogen pressure of 0.1 MPa to 10 MPa in the presence of a hydrogenation catalyst.

Examples of the hydrogenation catalyst include: Raney nickel; heterogeneous catalysts in which a metal such as platinum (Pt), palladium (Pd), ruthenium (Ru), rhodium (Rh), and nickel (Ni) is supported on a carrier such as carbon, alumina, and diatomaceous earth; Ziegler-based catalysts including combinations of organic metal compounds including Group 8 metals such as nickel and cobalt with organoaluminum or organolithium compounds such as triethylaluminum and triisobutylaluminum; and metallocene-based catalysts including combinations of bis(cyclopentadienyl) compounds of transition metals such as titanium, zirconium, and hafnium with organic metal compounds each containing lithium, sodium, potassium, aluminum, zinc, magnesium, or the like.

As a hydrogenated product of the block copolymer, those obtained by the method are preferably used.

((I) Properties and States of Hydrogenated Product of Block Copolymer)

From the viewpoint that the hydrogenated product of a block copolymer has excellent characteristics at a low temperature, a hydrogenated product including a block (b1) with a number average molecular weight of 1,000 to 30,000, in which the polymer block (A) has a number average molecular weight of 1,000 to 50,000, and further, the polymer block (B) has a content of 1,4-bond structural units in the conjugated diene compound units of less than 30% by mole (preferably 5% by mole to 25% by mole, and more preferably 10% by mole to 20% by mole); and a block (b2) with a number average molecular weight of 10,000 to 400,000 (preferably 10,000 to 200,000), in which the content of 1,4-bond structural units in the conjugated diene compound units is 30% by mole or more (preferably 30% by mole to 80% by mole, and more preferably 40% by mole to 70% by mole), is preferred. Further, the content of the 1,4-bond structural units in the entire polymer block (B) is preferably 20% by mole to 80% by mole, and more preferably 30% by mole to 70% by mole.

These hydrogenated products may be produced according to the above-described method, but they are preferably produced as follows. Among the non-polar solvents, the organolithium compound is used as a polymerization initiator, and α-methylstyrene at a concentration of 5% by mass to 50% by mass is polymerized at a temperature of −30° C. to 30° C. in the presence of a polar compound at a concentration of 0.1% by mass to 10% by mass. Subsequently, in the polymerization of the conjugated diene compound, the conjugated diene compounds in the amount of 1 molar equivalent to 100 molar equivalents with respect to the living poly-α-methylstyryl lithium are first polymerized to form a polymer block (b1), and then the reaction system is subjected to polymerization by the addition of the conjugated diene compound at a temperature higher than 30° C. to form a polymer block (b2).

In the thermoplastic polymer composition of the present invention, the hydrogenated product used as the component (I) has a number average molecular weight of 30,000 to 500,000. If the number average molecular weight is within the above range, the obtained thermoplastic polymer composition can be excellent in any of fluidity (molding processability), mechanical properties, and transparency. From this viewpoint, the number average molecular weight of the hydrogenated product of the block copolymer is preferably 40,000 to 400,000, more preferably 40,000 to 200,000, and still more preferably 40,000 to 100,000.

The structure of the hydrogenated product is not limited to a linear shape, a branched shape, or the like. Among these, a block copolymer having at least one (A-b1-b2) structure is preferred, and examples thereof include an A-b1-b2-b2-b1-A type copolymer, a mixture of an A-b1-b2-b2-b1-A type copolymer and an A-b1-b2 type copolymer, an (A-b1-b2)$_n$X type copolymer [in which X represents a residue of a coupling agent and n is an integer of 2 or more], and a mixture of an (A-b1-b2)$_n$X type copolymer and an A-b1-b2 type copolymer. Among these, from the viewpoints of the fluidity and the mechanical properties, an (A-b1-b2)$_n$X type copolymer, and a mixture of an (A-b1-b2)$_n$X type copolymer and an A-b1-b2 type copolymer are preferred, and an (A-b1-b2)$_2$X type copolymer, and a mixture of an (A-b1-b2)$_2$X type copolymer and an A-b1-b2 type copolymer are particularly preferred.

[Component (II)]

As the component (II), used is a hydrogenated product of a block copolymer having a polymer block (A') mainly containing aromatic vinyl compound units other than α-methylstyrene and a polymer block (B') mainly containing conjugated diene compound units, in which the block copolymer has a number average molecular weight of 15,000 to 500,000 and has a hydroxyl group. Among these, from the viewpoint of improving the transparency of the thermoplastic polymer composition, a hydrogenated product of a block copolymer having a hydroxyl group at one end of the polymer block (A) is preferably used.

The total content of the polymer block (A') and the polymer block (B') in the component (II) is preferably 70% by mass or more, more preferably 80% by mass or more, still more preferably 90% by mass or more, particularly preferably 95% by mass or more, and substantially preferably 100% by mass.

(Polymer Block (A'))

A polymer block (A') constituting a part of the component (II) mainly contains aromatic vinyl compound units other than α-methylstyrene units. The expression "being mainly containing" means being composed of aromatic vinyl compounds unit other than α-methylstyrene units in an amount of 50% by mass or more, preferably 70% by mass or more, more preferably 90% by mass or more, and still more preferably 95% by mass or more, based on the total mass of the polymer block (A'). Examples of the aromatic vinyl compounds forming the aromatic vinyl compound units include at least one selected from styrene, o-methylstyrene, p-methylstyrene, 1,3-dimethylstyrene, vinylnaphthalene, vinylanthracene, p-propylstyrene, p-t-butylstyrene, p-cyclohexylstyrene, p-dodecylstyrene, 2-ethyl-4-benzylstyrene, p-(phenylbutyl)styrene, monofluorostyrene, difluorostyrene, monochlorostyrene, dichlorostyrene, methoxystyrene, and indene. Among these, styrene is preferred.

The polymer block (A') may contain a small amount of structural units based on other polymerizable monomers, in addition to the structural units based on the aromatic vinyl compounds other than α-methylstyrene. In this case, the proportion of the structural units based on other polymerizable monomers is usually preferably 50% by mass or less, more preferably 30% by mass or less, still more preferably 10% by mass or less, and particularly preferably 5% by mass or less, based on the total mass of the polymer block (A'). Examples of such other polymerizable monomers include at least one selected from methacrylic esters, acrylic esters, 1-butene, pentene, hexene, butadiene, isoprene, and methyl vinyl ether.

In a case where the polymer block (A') contains other polymerizable monomer units, it may contain such other polymerizable monomer units in any of random and tapered forms.

The number average molecular weight of the polymer block (A') is preferably 1,000 to 50,000, more preferably 2,000 to 30,000, and still more preferably 3,000 to 15,000. If the number average molecular weight of the polymer block (A') is 1,000 or more, the permanent compression strain at a high temperature of the thermoplastic polymer composition is good, whereas if the number average molecular weight of the polymer block (A') is 50,000 or less, the melt viscosity of the block copolymer is not increased too high, and the block copolymer becomes easily melt-mixed with other components and has excellent processability.

The content of the polymer block (A') in the block copolymer is preferably 5% by mass to 70% by mass, more preferably 10% by mass to 60% by mass, still more preferably 10% by mass to 50% by mass, and more particularly preferably 20% by mass to 40% by mass, based on the total mass of the polymer blocks (A') and (B'). If the content of the polymer block (A') is 5% by mass or more, the dynamic strength of the thermoplastic polymer composition is improved, a good permanent compression strain at a high temperature can be obtained, and thus, the heat resistance is excellent. If the content of the polymer block (A') is 70% by mass or less, the melt viscosity of the block copolymer is not increased too much, and the melt-mixing with other components becomes easier, and further, in the case of forming a thermoplastic polymer composition, the flexibility is excellent.

(Polymer Block (B'))

The polymer block (B') constituting a part of the component (II) mainly contains conjugated diene compound units. The expression "mainly containing" means containing the conjugated diene compound units in an amount of 50% by mass or more, preferably 70% by mass or more, more preferably 90% by mass or more, and still more preferably 95% by mass or more, based on the total mass of the polymer block (B'). Examples of the conjugated diene compounds constituting the conjugated diene compound units include at least one selected from isoprene, butadiene, hexadiene, 2,3-dimethyl-1,3-butadiene, and 1,3-pentadiene. Among these, butadiene, isoprene, and a mixture of butadiene and isoprene are preferred. In a case where the polymer block (B') has a structural unit based on two or more kinds of conjugated diene compound, examples of the bonding form thereof include a random form, a block form, a tapered form, and a combination of two or more kinds thereof.

Furthermore, the polymer block (B') may be copolymerized with anion polymerizable monomers other than the conjugated diene compounds within a range not adversely affecting the purpose of the present invention as long as the content of such other anion polymerizable monomers is usually preferably 50% by mass or less, more preferably 30% by mass or less, still more preferably 10% by mass or less, and particularly preferably 5% by mass or less, based on the total mass of the polymer block (B'). Examples of such other copolymerizable monomers include at least one aromatic vinyl compound selected from styrene, α-methylstyrene, o-methylstyrene, m-methylstyrene, p-methylstyrene, 1,3-dimethylstyrene, diphenylethylene, 1-vinylnaphthalene, 4-propylstyrene, 4-cyclohexylstyrene, 4-dodecylstyrene, 2-ethyl-4-benzylstyrene, 4-(phenylbutyl)styrene, and the like. In a case where the conjugated diene compound and the aromatic vinyl compound are copolymerized, they are copolymerized in any of random and tapered forms.

In addition, it is necessary for the polymer block (B') to have a part or all of the carbon-carbon double bonds in the polymer block (B') hydrogenated from the viewpoints of weather resistance, heat resistance, and the like. At this time, the hydrogenation rate of the polymer block (B') is preferably 60% by mole or more, more preferably 80% by mole or more, still more preferably 90% by mole or more, and particularly preferably 95% by mole or more.

Particularly, the polymer block (B') is preferably a hydrogenated polyisoprene block in which a part or all of the carbon-carbon double bonds based on an isoprene unit of the polyisoprene block are hydrogenated; a hydrogenated polybutadiene block in which a part or all of the carbon-carbon double bonds based on a butadiene unit of the polybutadiene block are hydrogenated; or a copolymer block including a mixture of isoprene and butadiene, in which a part or all of the carbon-carbon double bonds based on an isoprene unit and a butadiene unit of the copolymer block including a mixture of isoprene and butadiene are hydrogenated, from the viewpoints of the weather resistance, the heat resistance, and the like of the thermoplastic polymer composition of the present invention. Among these, a copolymer block including a mixture of isoprene and butadiene is more preferred.

In the polyisoprene block, before the hydrogenation, the units derived from isoprene are formed of at least one group selected from the group consisting of a 2-methyl-2-butene-1,4-diyl group [—$CH_2$—$C(CH_3)$=CH—$CH_2$—; a 1,4-bond structural unit of isoprene], an isopropenylethylene group [—$CH(C(CH_3)$=$CH_2$)—$CH_2$—; a 3,4-bond structural unit of isoprene] and a 1-methyl-1-vinylethylene group [—C($CH_3$)(CH=$CH_2$)—$CH_2$—; a 1,2-bond structural unit of isoprene]; and the ratio of each unit is not particularly limited.

In the polybutadiene block, before the hydrogenation, the units derived from butadiene are formed of a 2-butene-1,4-diyl group (—$CH_2$—CH=CH—$CH_2$—; a 1,4-bond structural unit of butadiene), and a vinylethylene group [—CH(CH=CH)—$CH_2$—; a 1,2-bond structural unit of butadiene].

In the copolymer block including a mixture of isoprene and butadiene, before the hydrogenation, the units derived from isoprene are formed of a 2-methyl-2-butene-1,4-diyl group, an isopropenylethylene group, and a 1-methyl-1-vinylethylene group, and the units derived from butadiene are formed of a 2-butene-1,4-diyl group and a vinylethylene group, and the ratio of each unit is not particularly limited. With the copolymer block including a mixture of isoprene and butadiene, the configuration of the isoprene unit and the butadiene unit may be in any of random, block, and tapered forms. Further, with the copolymer block including a mixture of isoprene and butadiene, the ratio (molar ratio) of isoprene units:butadiene units/is preferably 10:90 to 90:10, and more preferably 30:70 to 70:30 from the viewpoint of improving the rubber elasticity.

The content of the polymer block (B') in the block copolymer is preferably 30% by mass to 95% by mass, more preferably 40% by mass to 90% by mass, still more preferably 50% by mass to 90% by mass, and particularly preferably 60% by mass to 80% by mass, based on the total mass of the polymer blocks (A') and (B'). If the content of the polymer block (B') is 30% by mass or more, the melt viscosity of the block copolymer does not become too high and the polymer block (B') is easily melt-mixed with other components, whereas if the content of the polymer block (B') is 95% by mass or less, the permanent compression strain at a high temperature is excellent when forming into a thermoplastic polymer composition.

The number average molecular weight of the polymer block (B') is preferably 10,000 to 349,000, more preferably 20,000 to 320,000, and still more preferably 30,000 to 300,000. If the number average molecular weight of the polymer block (B') is 10,000 or more, the heat resistance of the thermoplastic polymer composition is improved, whereas if the number average molecular weight is 349,000 or less, the melt viscosity of the block copolymer does not become too high, and the block copolymer is easily mixed with other components, and thus, has excellent processability.

(Bonding Type of Polymer Block (A') and Polymer Block (3'))

When the polymer block (A') is represented by A' and the polymer block (B') is represented by B', the block copolymer is a diblock copolymer represented by A'-B', a triblock copolymer represented by A'-B'-A' or B'-A'-B', various multi-block copolymers represented by A'-B'-A'-B', A'-B'-A'-B'-A', $(A-B')_p$, wherein p represents an integer of 3 or more, $(A-B')_q$-A, wherein q represents an integer of 2 or more, $(B'-A')_r$-B', wherein r represents an integer of 2 or more, $(A'-B')_n$-X, wherein n represents an integer of 3 or more and X represents a residue of a coupling agent, or the like, and may be any one of the copolymers. Among these, a triblock copolymer represented by A'-B'-A' is particularly preferred from the viewpoints of obtaining a superior effect of improving the physical properties and higher heat resistance of the thermoplastic polymer composition.

It is required for the number average molecular weight of the block copolymer to be 15,000 to 500,000. Within this range, the obtained composition can be excellent in any of fluidity (molding processability), mechanical properties, and transparency. From the same viewpoints, the number average molecular weight is preferably 20,000 to 100,000, and more preferably 30,000 to 80,000.

<Polymerization>

The method for producing the block copolymer is not limited in any way, and the block copolymer can be produced by a known polymerization method, for example, an ionic polymerization method such as anionic polymerization and cationic polymerization, a radical polymerization method, or the like. Specifically, in a case where an anionic polymerization method is used, the block copolymer can be formed by carrying out successive polymerization of aromatic vinyl compounds and conjugated diene compounds in an organic solvent inert to the polymerization reaction, such as n-hexane and cyclohexane in the presence of an initiator such as an alkyl lithium compound.

In addition, with the component (II), it is necessary to introduce a hydroxyl group to the molecule before carrying out a hydrogenation reaction, as described later.

<Introduction of Hydroxyl Group>

The component (II) is a hydrogenated product of "a block copolymer having a hydroxyl group". The method for introducing a hydroxyl group into the block copolymer is not particularly limited, and examples of the method include:

(1) a method in which the residual unsaturated double bonds of the polymer block (B') are oxidized by a known method;

(2) a method in which vinyl esters such as vinyl ester are copolymerized during formation of the polymer block (B') and then saponified with an alkali or an acid;

(3) a method in which a block copolymer is dissolved in an organic solvent such as tetrahydrofuran, diethyl ether, and dioxane to afford a solution, the residual unsaturated double bonds of the polymer block (B') in the solution are reacted with an organoboron compound, and the reaction product is reacted with aqueous hydrogen peroxide in the presence of sodium hydroxide (a so-called hydroboration method); and (4) a method in which a block copolymer is formed and then reacted with an alkyelene oxide such as ethylene oxide and propylene oxide.

Among those, the method (4) is preferred from the viewpoint of efficiently obtaining a hydrogenated product of "a block copolymer having a hydroxyl group".

The ratio of the hydroxyl group introduced into one end of the block copolymer is preferably 80% by mole or more, and more preferably 90% by mole or more, from the viewpoint of improving the transparency. Usually, such a ratio of the hydroxyl group is introduced into "one end" of the block copolymer.

In addition, the ratio of the hydroxyl group introduced into the block copolymer can be calculated using a nuclear magnetic resonance spectrum ($^{1}$H-NMR spectrum).

<Hydrogenation Reaction>

The hydrogenation reaction of the block copolymer having a hydroxyl group introduced thereinto can be carried out under the conditions of a reaction temperature of 20° C. to 100° C. and a hydrogen pressure of 0.1 MPa to 10 MPa in the presence of a hydrogenation catalyst.

Examples of the hydrogenation catalyst include Raney nickel; a heterogeneous catalyst having a metal such as platinum (Pt), palladium (Pd), ruthenium (Ru), rhodium (Rh), and nickel (Ni) carried on a support such as carbon, alumina, and diatomaceous earth; a Ziegler type catalyst formed of a combination of an organic metal compound including metals belonging to Groups 8 to 10, such as nickel and cobalt, an organolithium compound, and the like; or a metallocene-based catalyst formed of a combination of a bis(cyclopentadienyl) compound of a transition metal such as titanium, zirconium, and hafnium and an organic metal compound containing lithium, sodium, potassium, aluminum, zinc, and magnesium, in a saturated hydrocarbon-based solvent such as cyclohexane, for the block copolymer.

((II) State of Hydrogenated Product of Block Copolymer Containing Hydroxyl Group)

For the hydrogenated product of a block copolymer having a hydroxyl group, the polymer block (B'), it is preferable that at least one kind of isoprene-derived 1,4-bond structural units and butadiene-derived 1,4-bond structural units, and the content of the 1,4-bond structural units is 30% by mole or more of the structural units constituting the polymer block (B'). It is also preferable that polymer block (B') has at least one kind of isoprene-derived 3,4-bond structural units and butadiene-derived 1,2-bond structural units, and the content of the 3,4-bond structural units and the 1,2-bond structural units is less than 30% by mole of the structural units constituting the polymer block (B'). The number average molecular weight of the hydrogenated product used as the component (II) is 15,000 to 500,000. If the number average molecular weight is within this range, the obtained thermoplastic polymer composition can be excellent in any of fluidity (molding processability), mechanical properties, and transparency. From this viewpoint, the number average molecular weight of the hydrogenated product of a block copolymer is preferably 40,000 to 200,000. The structure of the hydrogenated product is not limited to a linear shape, a branched shape, or the like.

[(III) Polypropylene-Based Polymer]

Examples of the propylene-based polymer include homopolypropylene, random polypropylene, block polypropylene, atactic polypropylene, syndiotactic polypropylene, and a modified product thereof. Examples of the modified product include a product obtained by subjecting a propylene-based polymer to graft copolymerization with a modifier, and a product obtained by copolymerizing a modifier into the main chain of a propylene-based polymer. Specific examples of the modifier include unsaturated dicarboxylic acids such as maleic acid, citraconic acid, halogenated maleic acids, itaconic acid, cis-4-cyclohexene-1,2-dicarboxylic acid, and endo-cis-bicyclo[2.2.1]-5-heptene-2,3-dicarboxylic acid; esters, amides, and imides of unsaturated dicarboxylic acids; anhydrides of unsaturated dicarboxylic acids, such as maleic anhydride, citraconic anhydride, halogenated maleic anhydrides, itaconic anhydride, cis-4-cyclohexene-1,2-dicarboxylic anhydride, and endo-cis-bicyclo [2.2.1]-5-heptene-2,3-dicarboxylic anhydride; unsaturated monocarboxylic acids such as acrylic acid, methacrylic acid, and crotonic acid; and esters, amides, and imides of unsaturated monocarboxylic acids (such as methyl acrylate, ethyl acrylate, methyl methacrylate, and ethyl methacrylate). Among these, unsaturated dicarboxylic anhydrides are preferred, and maleic anhydride is more preferred, as a modifier.

Among these, from the viewpoint of the abrasion resistance of the thermoplastic polymer composition, at least one selected from homopolypropylene, random polypropylene, and block polypropylene is preferably used, and at least one selected from random polypropylene and homopolypropylene is more preferably used.

The polypropylene-based polymers may be used alone or in combination of two or more kinds thereof.

When the melt flow rate (MFR) of the propylene-based polymer measured under the conditions of 230° C. and 21.18 N is too small, the molding processability and the abrasion resistance of the thermoplastic polymer composition tend to be impaired. Therefore, the melt flow rate is preferably 0.1 g/10 min or more, and from the viewpoints of the molding processability and the abrasion resistance of the thermoplastic polymer composition, the melt flow rate is more preferably in the range of 1 g/10 min to 100 g/10 min, still more preferably in the range of 3 g/10 min to 80 g/10 min, and particularly preferably in the range of 15 g/10 min to 60 g/10 min. In addition, the MFR is a value measured in accordance with JIS K 7210.

[(IV) Polyethylene-Based Polymer]

Examples of the polyethylene-based polymer include ethylene homopolymers such as medium-density polyethylenes and low-density polyethylenes (LDPEs); ethylene/α-olefin copolymers such as ethylene/1-butene copolymers, ethylene/1-hexene copolymers, ethylene/1-heptene copolymers, ethylene/1-octane copolymers, ethylene/4-methyl-1-pentene copolymers, ethylene/1-nonene copolymers, and ethylene/1-decene copolymers; ethylene/vinyl acetate copolymers; ethylene/acrylic acid copolymers; ethylene/methacrylic acid copolymers; and modified products of the above polymers and copolymers. Examples of the modified products include products obtained by graft copolymerization of an ethylene-based polymer with a modifier, and products obtained by copolymerizing a modifier into the main chain of an ethylene-based polymer. Specific examples of the modifier include: unsaturated dicarboxylic acids such as maleic acid, citraconic acid, halogenated maleic acids, itaconic acid, cis-4-cyclohexene-1,2-dicarboxylic acid, and endo-cis-bicyclo[2.2.1]-5-heptene-2,3-dicarboxylic acid; esters, amides, and imides of unsaturated dicarboxylic acids; anhydrides of unsaturated dicarboxylic acids such as maleic anhydride, citraconic anhydride, halogenated maleic anhydrides, itaconic anhydride, cis-4-cyclohexene-1,2-dicarboxylic anhydride, and endo-cis-bicyclo[2.2.1]-5-heptene-2,3-dicarboxylic anhydride; unsaturated monocarboxylic acids such as acrylic acid, methacrylic acid, and crotonic acid; and esters, amides, and imides of unsaturated monocarboxylic acids (such as methyl acrylate; ethyl acrylate, methyl methacrylate, and ethyl methacrylate). Among these, unsaturated dicarboxylic anhydrides are preferred, and maleic anhydride is more preferred, as a modifier.

Among these, as a polyethylene-based polymer, an ethylene homopolymer is preferred, and a low-density polyethylene is more preferred. From the viewpoints of a balance of the flexibility and the abrasion resistance of the thermoplastic polymer composition, an ethylene-based polymer produced using a metallocene catalyst is particularly preferably used.

The polyethylene-based polymers may be used alone or in combination of two or more kinds thereof.

From the viewpoints of the flexibility and the abrasion resistance, the density of the polyethylene-based polymer is preferably 0.95 g/cm$^3$ or less, more preferably 0.85 g/cm$^3$ to 0.95 g/cm$^3$, and still more preferably 0.85 g/cm$^3$ to 0.93 g/cm$^3$. By using an ethylene-based polymer having a density of 0.95 g/cm$^3$ or less, the flexibility and the abrasion resistance are improved.

(Content Ratio of Components (I) to (IV))

The thermoplastic polymer composition of the present invention contains the components (I) to (IV) at a ratio satisfying the following expressions (1) to (4):

$$0.03 \leq W(I)/(W(I)+W(II)+W(III)+W(IV)) \leq 0.9 \quad (1)$$

$$0.03 \leq W(II)/(W(I)+W(II)+W(III)+W(IV)) \leq 0.9 \quad (2)$$

$$0.03 \leq W(III)/(W(I)+W(II)+W(III)+W(IV)) \leq 0.9 \quad (3)$$

$$0.03 \leq W(IV)/(W(I)+W(II)+W(III)+W(IV)) \leq 0.9 \quad (4)$$

wherein W(I), W(II), W(III), and W(IV) represent the mass contents of the component (I), the component (II), the component (III), and the component (IV) in the thermoplastic polymer composition, respectively.

In the expression (1), from the viewpoint of the mechanical strength, the lower limit of "W(I)/(W(I)+W(II)+W(III)+W(IV))" is preferably 0.05, more preferably 0.1, and still more preferably 0.15. Further, from the viewpoints of the abrasion resistance, the moldability, and the transparency, the upper limit of "W(I)/(W(I)+W(II)+W(III)+W(IV))" is preferably 0.7, more preferably 0.5, and still more preferably 0.45.

In the expression (2), from the viewpoints of the abrasion resistance and the transparency, the lower limit of "W(II)/(W(I)+W(II)+W(III)+W(IV))" is preferably 0.05, more preferably 0.1, and still more preferably 0.15. Further, from the viewpoint of the mechanical strength, the upper limit of "W(II)/(W(I)+W(II)+W(III)+W(IV))" is preferably 0.7, and more preferably 0.5.

In the expression (3), from the viewpoint of the moldability, the lower limit of "W(III)/(W(I)+W(II)+W(III)+W(IV))" is preferably 0.05, more preferably 0.1, and still more preferably 0.2. Further, from the viewpoint of the moldability, the upper limit of "W(III)/(W(I)+W(II)++W(IV))" is preferably 0.7, more preferably 0.5, and still more preferably 0.4.

In the expression (4), from the viewpoint of the moldability, the lower limit of "W(IV)/(W(I)+W(II)++W(IV))" is preferably 0.05, and more preferably 0.072. Further, from the viewpoint of the moldability, the upper limit of "W(IV)/(W(I)+W(II)+W(IV))" is preferably 0.7, more preferably 0.5, more preferably 0.4, still more preferably 0.3, and particularly preferably 0.2.

Furthermore, in the thermoplastic polymer composition of the present invention, the content ratio [(I):(II)] (based on mass) of the component (I) to the component (II) is 10:90 to 90:10. If the content ratio is out of the range, the effect of improving the abrasion resistance and the transparency is insufficient. From the same viewpoints, the [(I):(II)] (based on mass) is preferably 15:85 to 85:15, more preferably 20:80 to 80:20, more preferably 30:70 to 80:20, still more preferably 30:70 to 70:30, and particularly preferably 40:60 to 70:30.

In addition, in the thermoplastic polymer composition of the present invention, from the viewpoints of the mechanical strength, the moldability, the abrasion resistance, and the transparency, the content ratio [(III):(IV)] (based on mass) of the component (III) to the component (IV) is preferably 40:60 to 90:10, more preferably 50:50 to 85:15, and still more preferably 6040 to 85:15.

[Other Components]

The thermoplastic polymer composition of the present invention may contain, in addition to the components (I) to (IV), other components, as necessary. Examples of such other components include inorganic fillers such as talc, clay, mica, calcium silicate, glass, hollow glass spheres, glass fibers, calcium carbonate, magnesium carbonate, basic/magnesium carbonate, aluminum hydroxide, magnesium hydroxide, calcium hydroxide, zinc borate, dawsonite, ammonium polyphosphate, calcium aluminate, hydrotalcite, silica, alumina, titanium oxide, iron oxide, zinc oxide, magnesium oxide, tin oxide, antimony oxide, barium ferrite, strontium ferrite, carbon black, graphite, carbon fibers, activated carbon, hollow carbon spheres, calcium titanate, lead zirconate titanate, silicon carbide, and mica; organic fillers such as wood flour and starch; and organic pigments.

In addition, the thermoplastic polymer composition may contain other additives such as a thermal stabilizer, a light stabilizer, an ultraviolet absorber, an antioxidant, a lubricant, a coloring agent, an antistatic agent, a flame retardant, a foaming agent, a water repellant, a water-proofing agent, a tackifying resin, an electrical conductivity-imparting agent, a heat conductivity-imparting agent, an electromagnetic wave shielding property-imparting agent, a fluorescent agent, an antiblocking agent, and an antibacterial agent.

In a case where the thermoplastic polymer composition of the present invention contains other components, the content of such other components is not particularly limited within a range not adversely affecting the object of the present invention, but it is each usually preferably 30 parts by mass or less, more preferably each 20 parts by mass or less, and still more preferably each 10 parts by mass or less, with respect to 100 parts by mass of total amount of the components (I) to (IV).

The method for preparing the thermoplastic polymer composition is not particularly limited, and any method which can mix the components homogeneously may be used, but a melt kneading method is usually used.

The thermoplastic polymer composition of the present invention can be produced by kneading the components (I) to (IV) and other components to be added as necessary, using a kneading device such as a single screw extruder, a twin screw extruder, a kneader, a Banbury mixer, or rolls, for example. This kneading is usually carried out at preferably 160° C. to 270° C., and preferably 160° C. to 230° C.

The thermoplastic polymer composition thus obtained can be molded and processed by any of various molding methods such as an injection molding method (such as an insert molding method, a two-color molding method, a sandwich molding method, and a gas injection molding method) and an extrusion molding method, an inflation molding method, a T-die film molding method, a laminate molding method, a blow molding method, a hollow molding method, a compression molding method, and a calendar molding method.

Moreover, the melt flow rate (MFR) of the thermoplastic polymer composition of the present invention is in the range of usually 1 g/10 min to 40 g/10 min, more specifically 2 g/10 min to 35 g/10 min, and still more specifically 3 g/10 min to 25 g/10 min. With an MFR within this range, the molding processability is improved.

The tensile strength is in the range of usually 25 MPa to 40 MPa, and more specifically 25 MPa to 35 MPa.

The abrasion amount by a DIN abrasion test is in the range of usually 60 mm$^3$ to 90 mm$^3$, and more specifically 74 mm$^3$ to 90 mm$^3$.

The haze is in the range of usually 14% to 19%, and more specifically 14.5% to 18.5%. Further, the haze gives a great effect with a decrease by 1%, particularly in the applications of shoes or an outer sole of shoes.

In addition, the MFR, the tensile strength, the abrasion amount, and the haze are values measured by the method described in Examples.

EXAMPLES

Hereinafter, the present invention will be described in more detail by way of Examples and the like. However, the present invention is not limited to such Examples.

Furthermore, the following are used as the respective components used in Examples and Comparative Examples.

Moreover, the number average molecular weight was determined as a value relative to polystyrene as a standard by carrying out gel permeation chromatography (GPC) measurement carried out under the following conditions.

(Conditions for GPC Measurement)

Column: "TSKgel G4000HXL" (trade name)×2, product of Tosoh Corporation (column temperature: 40° C.)

Mobile phase: tetrahydrofuran (flow rate: 1 ml/min)

Detector: differential refractometer (a multi-wavelength detector (detection wavelength: 254 nm) is further connected)

Standard material: TSK standard polystyrene, product of Tosoh Corporation

Sample concentration: 0.06% by mass

Production of Hydrogenated Product of Block Copolymer (I)

Production Example 1

Production of Hydrogenated Block Copolymer (I)-1

A pressure container equipped with a stirrer, which had been purged with nitrogen, was charged with 90.9 g of α-methylstyrene, 138 g of cyclohexane, 15.2 g of methylcyclohexane, and 3.1 g of tetrahydrofuran. To the mixed liquid was added 9.4 mL of sec-butyl lithium (a 1.3 M cyclohexane solution), and the mixture was subjected to polymerization at −10° C. for 3 hours, thereby forming a polymer block (A). The number average molecular weight (Mn) of poly-α-methylstyrene (polymer block (A)) after 3 hours from initiation of the polymerization was 6,600 and the polymerization conversion rate of α-methylstyrene was 89%.

Subsequently, 23 g of butadiene was added to the reaction mixed liquid, the mixture was stirred at −10° C. for 30 minutes and polymerized, and then 930 g of cyclohexane was added thereto. The polymerization conversion rate of α-methylstyrene at this point was 89%. The number average molecular weight (GPC measurement, relative to polystyrene as a standard) of the polybutadiene block (b1) thus formed was 3,700 and the content of the 1,4-bond structural units as determined by $^1$H-NMR measurement was 19% by mole.

Next, 141.3 g of butadiene was added to the reaction liquid and the mixture was subjected to a polymerization reaction at 50° C. for 2 hours. The number average molecular weight (Mn) of the polybutadiene block (b2) of the block copolymer (structure: A-b1-b2) sampled at this point was 29,800, and the content of the 1,4-bond structural units as determined by $^1$H-NMR measurement was 60% by mole.

Subsequently, to this polymerization reaction solution was added 12.2 mL of dichlorodimethylsilane (a 0.5 M toluene solution), and the mixture was stirred at 50° C. for 1 hour, thereby obtaining a poly-α-methylstyrene-polybutadiene-poly-α-methylstyrene triblock copolymer. The coupling efficiency at this point was calculated from the ratio between the UV absorption area in GPC performed on the coupled product (a poly-α-methylstyrene-polybutadiene-poly-α-methylstyrene triblock copolymer: A-b1-b2-X-b2-b1-A; in which X represents a residue of the coupling agent (—Si(Me$_2$)-), the number average molecular weight (Mn)= 81,000) and the UV absorption area in GPC performed on the unreacted block copolymer (a poly-α-methylstyrene-polybutadiene block copolymer: A-b1-b2, the number average molecular weight (Mn)=41,000), and the coupling efficiency was found to be 94% by mass. Further, the results of $^1$H-NMR analysis showed that the content of the poly-α-methylstyrene blocks in the poly-α-methylstyrene-polybutadiene-poly-α-methylstyrene triblock copolymer was 33% by mass and the content of the 1,4-bond structural units in the polybutadiene block (the polymer block (B)) as a whole, that is, the blocks (b1) and (b2) was 56% by mole.

A Ziegler type hydrogenation catalyst formed from nickel octylate and triethylaluminum was added to the obtained polymerization reaction solution in a hydrogen atmosphere, and the mixture was subjected to a hydrogenation reaction at a hydrogen pressure of 0.8 MPa and 80° C. for 5 hours, thereby obtaining a hydrogenated product of the poly-α-methylstyrene-polybutadiene-poly-α-methylstyrene triblock copolymer (hereinafter abbreviated as a hydrogenated block copolymer (I)-1).

The obtained hydrogenated block copolymer (1)-1 was subjected to GPC measurement and the results thereof demonstrated that the main component was a hydrogenated product (coupled product) of the poly-α-methylstyrene-polybutadiene-poly-α-methylstyrene triblock copolymer having a peak top molecular weight (Mt)=81,000, a number average molecular weight (Mn)=78,700, a weight average molecular weight (Mw)=79,500, and MW/Mn=1.01, and that the hydrogenated block copolymer (I)-1 contained the coupled product in an amount of 94% by mass as determined from the ratio of UV (254 nm) absorption areas in GPC. Further, the hydrogenation rate of the polybutadiene block (the polymer block (B)) containing the blocks (b1) and (b2) was 97% by mole as determined by $^1$H-NMR measurement.

Production Example 2

Production of Hydrogenated Block Copolymer (I)-2

A pressure container equipped with a stirrer, which had been purged with nitrogen, was charged with 90.9 g of α-methylstyrene, 138 g of cyclohexane, 15.2 g of methylcyclohexane, and 3.1 g of tetrahydrofuran. To the mixed liquid was added 2.35 mL of sec-butyl lithium (a 1.3 M cyclohexane solution), and the mixture was subjected to polymerization at −10° C. for 3 hours, thereby forming a polymer block (A). The number average molecular weight (Mn) of poly-α-methylstyrene (polymer block (A)) after 3 hours from initiation of the polymerization was 30,000 and the polymerization conversion rate of α-methylstyrene was 89%.

Subsequently, 23 g of butadiene was added to the reaction mixed liquid, the mixture was stirred at −10° C. for 30 minutes and polymerized, and then 930 g of cyclohexane was added thereto. The polymerization conversion rate of α-methylstyrene at this point was 89%. The number average molecular weight (GPC measurement, relative to polystyrene as a standard) of the polybutadiene block (b1) thus formed was 14,700 and the content of the 1,4-bond structural units as determined by $^1$H-NMR measurement was 19% by mole.

Next, 141.3 g of butadiene was added to the reaction liquid and the mixture was subjected to a polymerization reaction at 50° C. for 2 hours. The number average molecular weight (Mn) of the polybutadiene block (b2) of the block copolymer (structure: A-b1-b2) sampled at this point was 102,000, and the content of the 1,4-bond structural units as determined by $^1$H-NMR measurement was 60% by mole.

Subsequently, to this polymerization reaction solution was added 2.9 mL of dichlorodimethylsilane (a 0.5 M toluene solution), and the mixture was stirred at 50° C. for 1 hour, thereby obtaining a poly-α-methylstyrene-polybutadiene-poly-α-methylstyrene triblock copolymer. The coupling efficiency at this point was calculated from the ratio between the UV absorption area in GPC performed on the coupled product (a poly-α-methylstyrene-polybutadiene-poly-α-methylstyrene triblock copolymer: A-b1-b2-X-b2-b1-A; in which X represents a residue of the coupling agent (—Si(Me$_2$)-), the number average molecular weight (Mn)=310,000) and the UV absorption area in GPC performed on the unreacted block copolymer (a poly-α-methylstyrene-polybutadiene block copolymer: A-b1-b2, the number average molecular weight (Mn)=154,000), and the coupling efficiency was found to be 94% by mass. Further, the results of $^1$H-NMR analysis showed that the content of the poly-α-methylstyrene blocks in the poly-α-methylstyrene-polybutadiene-poly-α-methylstyrene triblock copolymer was 33% by mass and the content of the 1,4-bond structural units in the polybutadiene block (the polymer block (B)) as a whole, that is, the blocks (b1) and (b2) was 56% by mole.

A Ziegler type hydrogenation catalyst formed from nickel octylate and triethylaluminum was added to the obtained polymerization reaction solution in a hydrogen atmosphere, and the mixture was subjected to a hydrogenation reaction at a hydrogen pressure of 0.8 MPa and 80° C. for 5 hours, thereby obtaining a hydrogenated product of the poly-α-methylstyrene-polybutadiene-poly-α-methylstyrene triblock copolymer (hereinafter abbreviated as a hydrogenated block copolymer (I)-2).

The obtained hydrogenated block copolymer (I)-2 was subjected to GPC measurement and the results thereof demonstrated that the main component was a hydrogenated product (coupled product) of the poly-α-methylstyrene-polybutadiene-poly-α-methylstyrene triblock copolymer having a peak top molecular weight (Mt)=320,000, a number average molecular weight (Mn)=317,000, a weight average molecular weight (Mw)=318,500, and Mw/Mn=1.01, and that the hydrogenated block copolymer (I)-2 contained the coupled product in an amount of 94% by mass as determined from the ratio of UV (254 nm) absorption areas in GPC. Further, the hydrogenation rate of the polybutadiene block (the polymer block (B)) containing the blocks (b1) and (b2) was 97% by mole as determined by $^1$H-NMR measurement.

Production Example 3

Production of Hydrogenated Block Copolymer (I)-3

A pressure container equipped with a stirrer, which had been purged with nitrogen, was charged with 90.9 g of α-methylstyrene, 138 g of cyclohexane, 15.2 g of methylcyclohexane, and 5.7 g of tetrahydrofuran. To the mixed liquid was added 9.4 mL of sec-butyl lithium (a 1.3 M cyclohexane solution), and the mixture was subjected to polymerization at −10° C. for 3 hours, thereby forming a polymer block (A). The number average molecular weight (Mn) of poly-α-methylstyrene (polymer block (A)) after 3 hours from initiation of the polymerization was 6,600 and the polymerization conversion rate of α-methylstyrene was 89%.

Subsequently, 23 g of butadiene was added to the reaction mixed liquid, the mixture was stirred at −10° C. for 50 minutes and polymerized, and then 930 g of cyclohexane was added thereto. The polymerization conversion rate of α-methylstyrene at this point was 89%. The number average molecular weight (GPC measurement, relative to polystyrene as a standard) of the polybutadiene block (b1) thus formed was 4,400 and the content of the 1,4-bond structural units as determined by $^1$H-NMR measurement was 19% by mole.

Next, 141.3 g of butadiene was added to the reaction liquid and the mixture was subjected to a polymerization reaction at 50° C. for 2 hours. The number average molecular weight (Mn) of the polybutadiene block (b2) of the block copolymer (structure: A-b1-b2) sampled at this point was 29,800, and the content of the 1,4-bond structural units as determined by $^1$H-NMR measurement was 52% by mole.

Subsequently, to this polymerization reaction solution was added 12.2 mL of dichlorodimethylsilane (a 0.5 M toluene solution), and the mixture was stirred at 50° C. for 1 hour, thereby obtaining a poly-α-methylstyrene-polybutadiene-poly-α-methylstyrene triblock copolymer. The coupling efficiency at this point was calculated from the ratio between the UV absorption area in GPC performed on the coupled product (a poly-α-methylstyrene-polybutadiene-poly-α-methylstyrene triblock copolymer: A-b1-b2-X-b2-b1-A; in which X represents a residue of the coupling agent (—Si(Me$_2$)-), the number average molecular weight (Mn)=81,000) and the UV absorption area in GPC performed on the unreacted block copolymer (a poly-α-methylstyrene-polybutadiene block copolymer: A-b1-b2, the number average molecular weight (Mn)=41,000), and the coupling efficiency was found to be 94% by mass. Further, the results of $^1$H-NMR analysis showed that the content of the poly-α-methylstyrene blocks in the poly-α-methylstyrene-polybutadiene-poly-α-methylstyrene triblock copolymer was 33% by mass and the content of the 1,4-bond structural units in the polybutadiene block (the polymer block (B)) as a whole, that is, the blocks (b1) and (b2) was 47% by mole.

A Ziegler type hydrogenation catalyst formed from nickel octylate and triethylaluminum was added to the obtained polymerization reaction solution in a hydrogen atmosphere, and the mixture was subjected to a hydrogenation reaction at a hydrogen pressure of 0.8 MPa and 80° C. for 5 hours, thereby obtaining a hydrogenated product of the poly-α- methylstyrene-polybutadiene-poly-α-methylstyrene triblock copolymer (hereinafter abbreviated as a hydrogenated block copolymer (I)-3).

The obtained hydrogenated block copolymer (I)-3 was subjected to GPC measurement and the results thereof demonstrated that the main component was a hydrogenated product (coupled product) of the poly-α-methylstyrene-polybutadiene-poly-α-methylstyrene triblock copolymer having a peak top molecular weight (Mt)=81,000, a number average molecular weight (Mn)=78,700, a weight average molecular weight (Mw)=79,500, and Mw/Mn=1.01, and that the hydrogenated block copolymer (I)-3 contained the coupled product in an amount of 94% by mass as determined from the ratio of UV (254 nm) absorption areas in GPC. Further, the hydrogenation rate of the polybutadiene block (the polymer block (B)) containing the blocks (b1) and (b2) was 97% by mole as determined by $^1$H-NMR measurement.

Production Example 4

Production of Hydrogenated Block Copolymer (I')-4 [Comparative]

A pressure container equipped with a stirrer, which had been purged with nitrogen, was charged with 81 g of styrene, 1,100 g of cyclohexane, and 3.1 g of tetrahydrofuran. To this solution was added 9.4 mL of sec-butyl lithium (a 1.3 M cyclohexane solution), and the mixture was subjected to polymerization at 50° C. for 1 hour. Subsequently, to this reaction mixture was added 164.3 g of butadiene, and the mixture was subjected to polymerization at 50° C. for 1 hour. Then, to this reaction mixture was further added 12.2 ml of dichlorodimethylsilane (a 0.5 M toluene solution), and the mixture was stirred at 50° C. for 1 hour, thereby obtaining a reaction mixed liquid including a polystyrene-polybutadiene-polystyrene triblock copolymer. Further, the results of $^1$H-NMR analysis showed that the content of the polystyrene blocks in the polystyrene triblock copolymer was 33% by mass and the content of the 1,4-bond structural units in the polybutadiene block was 60% by mole.

A hydrogenation catalyst including nickel octylate and triethylaluminum was added to the reaction mixture, and the mixture was subjected to a hydrogenation reaction at a hydrogen pressure of 0.8 MPa and 80° C. for 5 hours, thereby obtaining a hydrogenated product of the block copolymer (hereinafter abbreviated as a hydrogenated block copolymer (I')-4).

The number average molecular weight (Mn) of the obtained hydrogenated block copolymer (I')-4 was 85,000, and the hydrogenation rate of the polybutadiene block was 98% by mole.

Hydrogenated Product of Block Copolymer Having Hydroxyl Group (II)

Production Example 5

Production of Hydrogenated Block Copolymer (II)-1

A pressure container equipped with a stirrer was charged with 50 kg of cyclohexane, 1,400 g of styrene, and 210 g of sec-butyl lithium (10% by mass, a cyclohexane solution), and the mixture was subjected to polymerization at 60° C. for 60 minutes. Subsequently, 7,200 g of a mixture (50/50 (mass ratio)) of isoprene and butadiene was added thereto, and the mixture was polymerized for 60 minutes. 1,400 g of styrene was further added thereto and the mixture was polymerized for 60 minutes. Then, 14 g of ethylene oxide was added thereto and methanol was finally added to the mixture to terminate the polymerization reaction, thereby synthesizing a polystyrene-poly(isoprene/butadiene)-polystyrene triblock copolymer having a hydroxyl group at one end of the polystyrene polymer block on one side. The obtained block copolymer was hydrogenated by the same method as in Production Example 1 to obtain a hydrogenated product of a block copolymer [hereinafter abbreviated as a hydrogenated block copolymer (II)-1].

The obtained hydrogenated block copolymer (II)-1 was subjected to GPC measurement and the results thereof demonstrated that the main component had a peak top molecular weight (Mt)=53,200, a number average molecular weight (Mn)=51,700, a weight, average molecular weight (Mw)=52,200, and Mw/Mn=1.01. Further, the number average molecular weight (Mn) of the polystyrene block (A') was 4,500. Further, the results of $^1$H-NMR analysis showed that the content of the polystyrene blocks in the polystyrene triblock copolymer was 28% by mass and the content of the 1,4-bond structural units in the poly(isoprene/butadiene) block was 93% by mole, the number of the terminal hydroxyl groups per molecule was 0.83, and the hydrogenation rate was 98% by mole.

Production Example 6

Production of Hydrogenated Block Copolymer (II')-2 [Comparative]

A pressure container equipped with a stirrer was charged with 50 kg of cyclohexane, 1,400 g of styrene, and 210 g of sec-butyl lithium (10% by mass, a cyclohexane solution), and the mixture was subjected to polymerization at 60° C. for 60 minutes. Subsequently, 7,200 g of a mixture (50/50 (mass ratio)) of isoprene and butadiene was added thereto, and the mixture was polymerized for 60 minutes. 1,400 g of styrene was further added thereto and the mixture was polymerized for 60 minutes. Then, methanol was finally added to the mixture to terminate the reaction, thereby synthesizing a polystyrene-polystyrene-poly(isoprene/butadiene)-polystyrene triblock copolymer having no hydroxyl group at one end thereof. The obtained block copolymer was hydrogenated by the same method as in Production Example 1 to obtain a hydrogenated product of a block copolymer [hereinafter abbreviated as a hydrogenated block copolymer (II')-2].

The obtained hydrogenated block copolymer (II')-2 was subjected to GPC measurement and the results thereof demonstrated that the main component had a peak top molecular weight (Mt)=55,500, a number average molecular weight=54,000, a weight average molecular weight (Mw)=54,500, and Mw/Mn=1.01. Further, the number average molecular weight (Mn) of the polystyrene block (A') was 4,600. Further, the results of $^1$H-NMR analysis showed that the content of the polystyrene blocks in the polystyrene triblock copolymer was 30% by mass and the content of the 1,4-bond structural units in the poly(isoprene/butadiene) block was 93% by mole and the hydrogenation rate was 98% by mole.

Here, the physical properties of the hydrogenated block copolymers obtained in Production Examples 1 to 6 are summarized in Table 1 below.

TABLE 1

|  | | Hydrogenated block copolymer | Structure | Number average molecular weight (Mn) | Hydrogenation rate (% by mole) | Amount (% by mole) of 1,4-bonds | Content ratio (% by mole) of hydroxy groups at one end |
|---|---|---|---|---|---|---|---|
| Production Example | 1 | (I)-1 | mS-EB-mS | 78,700 | 97 | 56 | 0 |
| | 2 | (I)-2 | mS-EB-mS | 317,000 | 97 | 56 | 0 |
| | 3 | (I)-3 | mS-EB-mS | 78,700 | 97 | 47 | 0 |
| | 4 | (I')-4 | S-EB-S | 85,000 | 98 | 60 | 0 |
| | 5 | (II)-1 | S-EEP-S | 51,700 | 98 | 93 | 92 |
| | 6 | (II')-2 | S-EEP-S | 54,000 | 98 | 93 | 0 |

<Abbreviations in Description of Structures>
Polymer block (A) or (A')
mS: Poly(α-methylstyrene) block
S: Polystyrene block
Polymer block (B) or (B')
EB: Hydrogenated polybutadiene block
EEP: Hydrogenated poly(isoprene/butadiene) block
[(III) Polypropylene-Based Polymer]
((III)-1)
Homopolypropylene "J108M" (MFR [230° C., a load of 21.18 N]: 45 g/10 min, a density of 0.91 g/cm$^3$, manufactured by Prime Polymer Co., Ltd.)
((III)-2)
Random polypropylene "J226T" (MFR [230° C., a load of 21.18 N]: 20 g/10 min, a density of 0.91 g/cm$^3$, manufactured by Prime Polymer Co., Ltd.)
[(IV) Polyethylene-Based Polymer]
((IV)-1)
Linear low density polyethylene (LLDPE) "UJ990" (MFR [230° C., a load of 2.16 kg (21.18 N)]: 35 g/10 min, a density of 0.94 g/cm$^3$, manufactured by Japan polyethylene Corporation)
((IV)-2)
Linear low density polyethylene (LLDPE) "SUMIKATHENE EFV402" (MFR [230° C., a load of 2.16 kg (21.18 N)]: 4.0 g/10 min, a density of 0.92 g/cm$^3$, metallocene-based, manufactured by Sumitomo Chemical Co., Ltd.)

Examples 1 to 9 and Comparative Examples 1 to 4

The respective components were mixed at the mass ratios shown in Table 2, simultaneously mixed using a Henschel mixer, melt-kneaded using a twin screw extruder "TEM-35B" (manufactured by Toshiba Machine Co., Ltd.) under the conditions of 230° C. and a screw rotating speed of 200 rpm, extruded into a strand form, and then cut to obtain a thermoplastic polymer composition in the form of a pellet.

In order to measure the respective physical properties of the obtained thermoplastic polymer composition, the pellet was used, as necessary, to produce a predetermined molded article under the conditions of a cylinder temperature of 230° C. and a mold temperature of 40° C., using an injection molding apparatus "IS-55 EPN" (manufactured by Toshiba Machine Co., Ltd.), and then, the respective physical properties were measured and evaluated in the following manner. The results are shown in Table 2.

(1) Measurement of Melt Flow Rate (MFR)
The pellet of the thermoplastic polymer composition was used to measure MFR (g/10 min) under the conditions of 230° C. and a load of 2.16 kg (21.18 N) according to JIS K 7210, and the measured value was used as an indicator of molding processability. A higher MFR indicates superior molding processability.

(2) Measurement of Haze
A specimen molded to a thickness of 2 mm was used to measure a haze (in accordance with JIS K 7125) by a Haze meter "HR-100" (manufactured by Murakami Color Research Laboratory). A lower value indicates superior transparency.

(3) Measurement of Abrasion Amount
The abrasion resistance of molded articles of the thermoplastic polymer compositions obtained in Examples and Comparative Examples above was investigated using a DIN abrasion tester (trade name, "DIN abrasion tester GT-7012-D", manufactured by GOTECHTESTINGMACHINES) in accordance with JIS K 6264-2.

This DIN abrasion tester is a tester involving rotating a drum having a diameter of 150 mm and a width of 460 mm, while winding up an abrasive paper with #60, against the surface, at a speed of 0.32 m/sec, a sample for an abrasion test was pressed on the abrasive paper of the drum at a load of 10 N. In order to smooth the abrasive surface during the test, preliminary abrasion was carried out in advance. For the preliminary abrasion, the sample for an abrasion test was pressed on the drum to 20 m under an atmosphere at 23° C. Thereafter, the weight of the sample for an abrasion test after the preliminary abrasion was measured and the present test was carried out. In this present test, after pressing the sample to 40 m after the preliminary abrasion on the drum, the weight was measured. A difference between the weight before the present test and the weight after the present test was determined (this difference is referred to as an abrasion weight). In addition, in order to avoid the effect of the abrasion state of the abrasive paper, the abrasion weight of standard rubber was also measured in the same procedure as described above.

Here, when the abrasion weight of standard rubber is defined as $W_1$, the abrasion weight of the sample for an abrasion test is defined as $W_2$, and the specific gravity of the sample for an abrasion test is defined as S, the abrasion volume A (mm$^3$) of each of the samples for an abrasion test is determined by the following equation. Incidentally, as the value of the abrasion volume A (abrasion amount) is smaller, the abrasion resistance is superior.

$$A = (W_{2 \times 200})/(W_1 \times S)$$

(4) Measurement of Tensile Strength at Break (Tb)
A sheet was prepared by the same injection molding as in the above case of evaluation of abrasion resistance from the thermoplastic polymer composition, and a dumbbell No. 5 type specimen in accordance with JIS K 6251 was punched from the sheet. For the obtained specimen, a tensile test was carried out under the conditions of 23° C., a tensile speed of 500 mm/min, and a distance between chucks of 5 cm, and the tensile strength at break was measured.

TABLE 2

| | Component | Example 1 | 2 | 3 | 4 | 5 | 6 | 7 | 8 | 9 | Comparative Example 1 | 2 | 3 | 4 |
|---|---|---|---|---|---|---|---|---|---|---|---|---|---|---|
| (I) | Hydrogenated block copolymer (I)-1 | 30 | 15 | | | 30 | 30 | 10 | 40 | 50 | 60 | | | 30 |
| | Hydrogenated block copolymer (I)-2 | | | 30 | | | | | | | | | | |
| | Hydrogenated block copolymer (I)-3 | | | | 30 | | | | | | | | | |
| | Hydrogenated block copolymer (I')-4 | | | | | | | | | | | | 30 | |
| (II) | Hydrogenated block copolymer (II)-1 | 30 | 45 | 30 | 30 | 30 | 30 | 50 | 20 | 10 | | 60 | 30 | |
| | Hydrogenated block copolymer (II')-2 | | | | | | | | | | | | | 30 |
| (III) | Polypropylene-based polymer (III)-1 | 30 | 30 | 30 | 30 | | 30 | 30 | 30 | 30 | 30 | 30 | 30 | 30 |
| | Polypropylene-based polymer (III)-2 | | | | | 30 | | | | | | | | |
| (VI) | Polyethylene-based polymer (VI)-1 | 10 | 10 | 10 | 10 | 10 | | 10 | 10 | 10 | 10 | 10 | 10 | 10 |
| | Polyethylene-based polymer (VI)-2 | | | | | | 10 | | | | | | | |
| Measurement results | Melt Flow Rate (g/10 min) | 13 | 17 | 3 | 25 | 13 | 13 | 18 | 11 | 10 | 6.7 | 20 | 5.1 | 14 |
| | Haze (%) | 15.9 | 16.4 | 18 | 15 | 17 | 14.8 | 17.9 | 16.2 | 17.8 | 18.4 | 18.4 | 18.7 | 19 |
| | Wear amount (mm$^3$) | 81.4 | 82.6 | 75.0 | 80.0 | 81.0 | 81.0 | 89.8 | 83.3 | 87.2 | 92.8 | 98.3 | 103 | 100 |
| | Tensile strength (MPa) | 32 | 29 | 30 | 29 | 30 | 31 | 25 | 32 | 33 | 33 | 21 | 27 | 26 |

Figure 2:
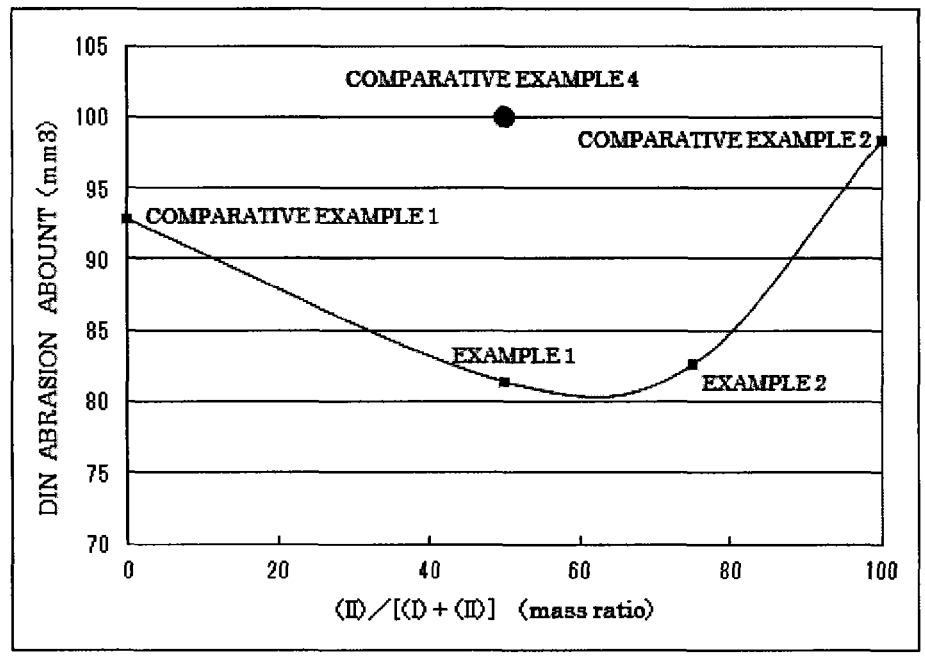
FIG. 2 is a graph showing the abrasion resistance of the thermoplastic polymer compositions obtained in Examples 1 and 2, and Comparative Examples 1, 2, and 4.

From Table 2, it can be seen that the thermoplastic polymer composition of the present invention has high tensile strength and also has both of high abrasion resistance and high transparency. Particularly, with reference to FIGS. 1 and 2 showing the results of Examples 1 and 2, and Comparative Examples 1, 2, and 3, it can be seen that an effect of improving transparency and abrasion resistance is remarkably exhibited.

INDUSTRIAL APPLICABILITY

The thermoplastic polymer composition of the present invention can be effectively used, by making use of their characteristics, in a wide range of applications such as, for example, automobile interior and exterior parts such as instrument panels, rack-and-pinion boots, suspension boots, constant velocity joint boots, bumpers, side moldings, weather strips, mud guards, emblems, leather seat, floor mats, arm rests, air bag covers, steering wheel covers, belt line moldings, flash mounts, gears, and knobs; hoses and tubes such as pressure hoses, fire hoses, hoses for coating, washing machine hoses, fuel tubes, oil hydraulic and pneumatic tubes, and tubes for dialysis; gripping materials for various products (such as scissors, drivers, toothbrushes, pens, and cameras); home-appliance parts such as refrigerator gaskets, vacuum cleaner bumpers, cellular phone protection films, and waterproof bodies; business machine parts such as feeding rollers and winding rollers for copy machines; furniture such as sofa and chair sheets; parts such as switch covers, casters, stoppers, and leg rubber; construction materials such as coated steel plates and coated plywood laminates; sporting goods such as swimming goggles, snorkels, ski sticks, ski boots, snowboard boots, ski or snowboard surface materials, golf ball covers, various shoes, and various outer soles; medical supplies such as syringe gaskets and rolling tubes; industrial materials such as conveyer belts, electric power belts, pelletizer rolls; stretchable parts of sanitary goods such as paper diapers, poultices, and bandages; band applications such as hair bands, wrist bands, watch bands, and eyeglass bands; other goods such as snow chains, wire coating materials, trays, films, sheets, stationery, toys, and sundry goods for daily use.

Among those, the thermoplastic polymer composition is particularly useful for sporting goods, specifically, shoes and an outer sole of shoes.

The invention claimed is:
1. A thermoplastic polymer composition comprising:
   (I) a hydrogenated product of a block copolymer having a polymer block (A) mainly containing α-methylstyrene units and a polymer block (B) mainly containing conjugated diene compound units, in which the block copolymer has a number average molecular weight of 30,000 to 500,000;
   (II) a hydrogenated product of a block copolymer having a polymer block (A') mainly containing aromatic vinyl compound units other than α-methylstyrene and a polymer block (B') mainly containing conjugated diene compound units, in which the block copolymer has a number average molecular weight of 15,000 to 500,000 and has a hydroxyl group;
   (III) a polypropylene-based polymer; and
   (IV) a polyethylene-based polymer
   at a ratio satisfying the following expressions (1) to (4), wherein the mass ratio [(I):(II)] of the component (I) to the component (II) is 10:90 to 90:10:

$$0.03 \leq W(I)/(W(I)+W(II)+W(III)+W(IV)) \leq 0.9 \quad (1)$$

$$0.03 \leq W(II)/(W(I)+W(II)+W(III)+W(IV)) \leq 0.9 \quad (2)$$

$$0.03 \leq W(III)/(W(I)+W(II)+W(III)+W(IV)) \leq 0.9 \quad (3)$$

$$0.03 \leq W(IV)/(W(I)+W(II)+W(III)+W(IV)) \leq 0.9 \quad (4)$$

wherein W(I), W(II), W(III), and W(IV) represent the mass contents of the component (I), the component (II), the component (III), and the component (IV) in the thermoplastic polymer composition, respectively.

2. The thermoplastic polymer composition according to claim 1, wherein in the component (I), the number average molecular weight of the polymer block (A) is 1,000 to 50,000, and the polymer block (B) includes a block (b1) with a number average molecular weight of 1,000 to 30,000, in which the content of 1,4-bond structural units in the conjugated diene compound units is less than 30% by mole, and a block (b2) with a number average molecular weight of 10,000 to 400,000, in which the content of 1,4-bond structural units in the conjugated diene compound units is 30% by mole or more.

3. The thermoplastic polymer composition according to claim 1, wherein the polymer block (B') in the component (II) has at least one of isoprene-derived 1,4-bond structural units and butadiene-derived 1,4-bond structural units, and the content of the 1,4-bond structural units is 30% by mole or more of the structural units constituting the polymer block (B').

4. The thermoplastic polymer composition according to claim 1, wherein the polymer block (B') in the component (II) has at least one of isoprene-derived 3,4-bond structural units and butadiene-derived 1,2-bond structural units, and the content of the 3,4-bond structural units and the 1,2-bond structural units is less than 30% by mole of the structural units constituting the polymer block (B').

5. Shoes, in which the thermoplastic polymer composition according to claim 1 is used in at least a part thereof.

6. An outer sole, in which the thermoplastic polymer composition according to claim 1 is used in at least a part thereof.

* * * * *